United States Patent [19]

Tejima

[11] Patent Number: 4,635,247
[45] Date of Patent: Jan. 6, 1987

[54] HIGH-SPEED BURST SIGNAL MONITORING DEVICE

[75] Inventor: Shunichiro Tejima, Tokyo, Japan

[73] Assignee: NEC Corporation, Japan

[21] Appl. No.: 704,287

[22] Filed: Feb. 22, 1985

[30] Foreign Application Priority Data

Feb. 24, 1984 [JP] Japan .................................. 59-32575

[51] Int. Cl.[4] ............................ H04J 1/16; H04J 3/14
[52] U.S. Cl. ........................................ 370/13; 370/17; 370/104; 455/69
[58] Field of Search ...................... 370/13, 17, 95, 104; 455/69; 375/58, 99

[56] References Cited

U.S. PATENT DOCUMENTS

| 3,824,548 | 7/1974 | Sullivan et al. | 370/17 |
| 4,228,538 | 10/1980 | Scharla-Nielsen et al. | 455/69 |
| 4,397,018 | 8/1983 | Fennel, Jr. et al. | 370/17 |
| 4,408,322 | 10/1983 | Chadwick et al. | 370/17 |

Primary Examiner—Douglas W. Olms
Assistant Examiner—Wellington Chin
Attorney, Agent, or Firm—Ostrolenk, Faber, Gerb & Soffen

[57] ABSTRACT

A high-speed burst monitoring device for large capacity burst signal processing which constantly monitors receipt conditions of received burst signals in a time division multiplex access (TDMA) communications system, in which each frame comprises several individual burst signals; and, depending upon the result of examining each of the receipt conditions, transmits a control message to a remote station which has transmitted a particular burst signal. Bursts are each allocated to a particular address of high-speed store means with a burst identification number used as address data. Every time a burst signal is received, record data associated with that burst is read out of the high-speed store means, burst condition data is updated by a burst condition signal generated this time, it is determined whether a condition for the generation of a control message is satisfied, and the updated data is stored anew in the high-speed store means as the latest burst condition data. Such a procedure is repeated at a high speed whereby all the receipt condition data are integrated burst by burst to decide whether generation of a control message is needed. In the case of large capacity burst signal processing, a control message transmission request signal may be temporarily stored in a memory buffer if a massage cannot immediately be sent so as to convert the data rate between high-speed data processing sections such as burst condition decision means and low-speed data processing sections such as a message processing section.

4 Claims, 8 Drawing Figures

Fig. 4A  BURST ID NO. 42 (12 BITS)

Fig. 4B  BURST CONDITION SIGNAL 48

Fig. 6

HIGH-SPEED BURST SIGNAL MONITORING DEVICE

BACKGROUND OF THE INVENTION

The present invention relates to a high-speed burst signal monitoring device associated with a burst signal processing apparatus in, for example, a time division multiple access (TDMA) communications system for monitoring receipt conditions of burst signals and transmitting a control message in response to a faulty signal from a burst transmit station or stations.

In a TDMA communications system, an example of communications systems which process burst signals, a multiplicity of stations share the same carrier frequency on a time division basis. Each of the participating stations sends burst signals intermittently to a communications line in synchronization with frame signals during those periods of time which are exclusively allocated thereto, so that the burst signals are multiplexed with those which are sent from the other stations without collision. In a TDMA communications system, therefore, a fault occurring in the time division control at any one of the participating stations is apt to immediately affect communications being held by all the stations in the system.

In light of this, a TDMA communications system needs to be provided with means for constantly monitoring receipt conditions of all the burst signals which are sent by the participating stations and, when a burst signal expected to be received at a predetermined position on the TDMA frame has not been detected at such position over a certain period of time, immediately instructing the receive station to send a control signal or a control message to a transmit station which is to transmit the burst signal, thereby controlling the burst of the transmit station. Usually, transmission of such a control message from a receive station to a transmit station is accomplished by use of a digital service channel or the like which is assigned as part of the data within a burst signal.

One approach to burst signal monitoring known in the communications art involves causing all the participating stations in a network to constantly monitor each other. Another known approach involves installing a master station in the network which controls all the participating stations and performs centralized monitoring of all the bursts of the stations. The problem with the prior art approach, whether it be the mutual monitoring type or the centralized monitoring type, is that the number of bursts to be received within one TDMA frame is considerable, particularly in a system of the kind covering a large number of stations, so that a monitoring device having a large capacity and operable at high speed is essential.

In a burst signal monitoring device employing any of the above-discussed approaches, an increase in the number of receive bursts is reflected by an increase in the number of circuit elements of the device, which in turn makes it difficult to realize a burst signal monitoring device capable of handling large capacity burst signals.

While the state of the art has been discussed concentrating to a TDMA communications system as an exemplary communications system and such system often includes an alarm signal as a control message, it should be born in mind that the content of the control message is not limited to an alarm function.

SUMMARY OF THE INVENTION

It is therefore an object of the present invention to provide a burst signal monitoring device which, despite an increase in the number of receive bursts, successfully processes burst data of each burst at a high speed on a real time basis to send a control message, without resorting to any significant increase in the number of circuit elements.

It is another object of the present invention to provide a generally improved burst signal monitoring device.

A high-speed burst monitoring device of the present invention constantly monitors receipt conditions of received burst signals in a time division multiplex access communications system and, depending upon a result of examining each of the receipt conditions, transmits a control message to a station which has transmitted a burst signal. The device comprises a burst condition detecting circuit for detecting a burst condition of each particular one of the received burst signals to generate a burst condition signal; a burst state (condition) decision circuit for providing latest burst condition data relative to said particular received burst signal in response to the latest burst condition signal output from the burst condition detecting circuit, and in response to burst record data indicative of the burst condition data relative to said particular received burst signal up to the next previous burst condition prior to the last receipt, and determining whether generation of a control message is necessary and, if necessary, generating a control message transmission request signal; a high-speed store for storing the burst state data indexed by a burst identification number which is assigned to each of the bursts so that the burst condition data is read out of the high-speed store as burst record data at the next receipt of the burst; a memory buffer for temporarily storing the control message transmission request signal output from the burst condition decision circuit and the burst identification number of the burst; and a message processing circuit for fetching the control message transmission request signal and the burst identification number from the memory buffer to generate a control message associated with the burst condition.

In accordance with the present invention, a high-speed burst monitoring device is provided for larger capacity burst signal processing which constantly monitors receipt conditions of receive burst signals in a time division multiplex access (TDMA) communications system and, depending upon the result of estimation of each of the receipt conditions, transmits a control message to a remote station which has transmitted a burst signal. Bursts are each allocated to a particular address of high-speed store means with a burst identification number used as address data. Every time a burst signal of a certain burst is received, record data associated with that burst is read out of the high-speed store means, burst condition data is updated by a burst condition signal generated this time, whether a condition for the generation of a control message is satisfied is determined, and the updated data is stored anew in the high-speed store means as the latest burst condition data. Such a procedure is repeated at a high speed whereby all the receipt condition data are integrated burst by burst to decide whether generation of a control message is needed. In the case of large capacity burst signal processing, a control message transmission request signal is temporarily stored in a memory buffer so as to convert the data rate between high-speed data processing sections such as burst condition decision means and low-speed data processing sections such as a message processing section.

The above and other objects, features and advantages of the present invention will become more apparent from the following detailed description taken with the accompanying drawings.

DESCRIPTION OF THE PREFERRED EMBODIMENT

While the high-speed burst signal monitoring device of the present invention is susceptible of numerous physical embodiments, depending upon the environment and requirements of use, a substantial number of the herein shown and described embodiments have been made, tested and used, and all have performed in an eminently satisfactory manner.

Figure 1:
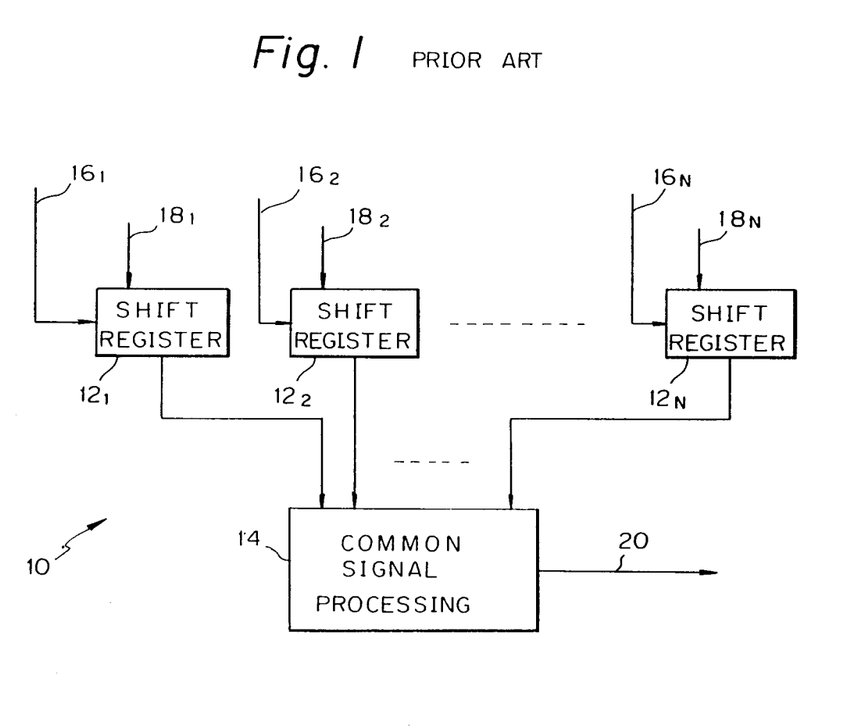
FIG. 1 is a block diagram of a prior art burst signal monitoring device.

To facilitate understanding of the present invention, a brief reference will be made to a prior art burst signal monitoring device, shown in FIG. 1. The prior art device, generally 10, is applicable to the case of the TDMA communications system which is designed with N receive bursts per frame. As shown, the device 10 comprises shift registers $12_1$–$12_N$ and a common signal processing circuit 14. The shift registers $12_1$–$12_N$ respectively are supplied with burst data $16_1$–$16_N$ and shift clocks (clock signals) $18_1$–$18_N$ which are output from a burst condition detector (not shown). The outputs of the shift registers $12_1$–$12_N$ are applied to the common signal processing circuit 14 which feeds a control message 20 to a transmit signal generator (not shown).

Figure 2A:
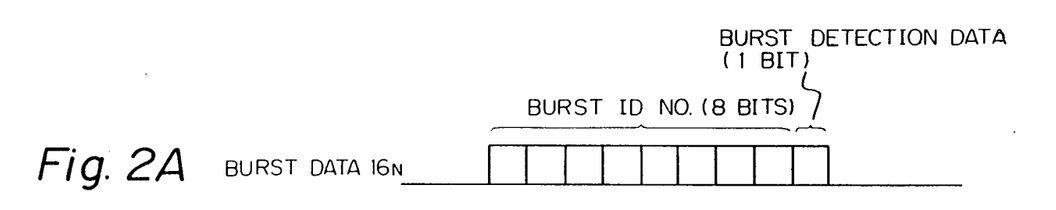
FIGS. 2A and 2B show waveforms of major signals appearing in the device of FIG. 1.
Figure 2B:
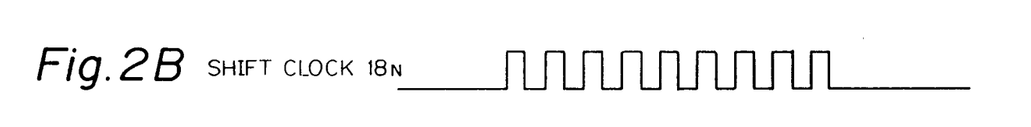

In detail, the burst data $16_1$–$16_N$ and the shift clocks $18_1$–$18_N$ associated in one-to-one correspondence with the burst data are applied to the individual shift registers $12_1$–$12_N$ independently of each other. Each of the burst data 16 is held in its associated shift register 12 until the next burst data and shift clock arrive, that is, for one TDMA frame. An example of the burst data $16_N$ is shown in FIG. 2A. The illustrative burst data $16_N$ is made up of nine bits in total, eight of which provide a burst identification (ID) number and one provides burst detection information (burst present/absent). Shown in FIG. 2B is the waveform of the shift clock $18_N$.

The common signal processing circuit 14 sequentially fetches the burst data residing in the shift registers $12_1$–$12_N$, integrates the burst detection informtion contained in the burst data, and, if the result is found to satisfy a condition of control message generation, generates and transmits the control message 20.

In the prior art construction shown and described, since the common signal processing circuit 14 sequentially fetches the contents of the parallel shift registers $12_1$–$12_N$, the number of bursts which can be real-time processed is limited in view of the particular relationship between the available processing time of the circuit 14 and the time for which data can be held in the shift registers $12_1$–$12_N$. Specifically, should the number of bursts to be processed increase to such an extent that the time between fetching of data of a certain burst by the circuit 14 and the next fetching of data of the same burst is made longer than the time for which single data can be kept in a shift register, the circuit 14 would be unable to fetch all the data.

Generally, a control message includes a number assigned to a destination, a burst number, and a kind of control data and, therefore, generation thereof often consumes a long period of time. The control message generation time becomes especially long in case the rules on the decision whether to generate a control message are complicated. Therefore, an attempt to determine whether to transmit a control message on the basis of all the bursts of data held in the parallel shift registers $12_1$–$12_N$ would make the number of bursts which can be handled extremely small; the only measure available for handling more bursts is sampling, that is, using the data held in the shift registers $12_1$–$12_N$ by sampling. In addition, inasmuch as one parallel circuit for holding burst data needs to be prepared for each burst, an increase in the number of receive bursts directly turns into an increase in the number of circuit elements. As a consequence, it is impracticable to implement a burst signal monitoring device of the prior art type that is capable of handling larger capacity burst signals.

Figure 3:
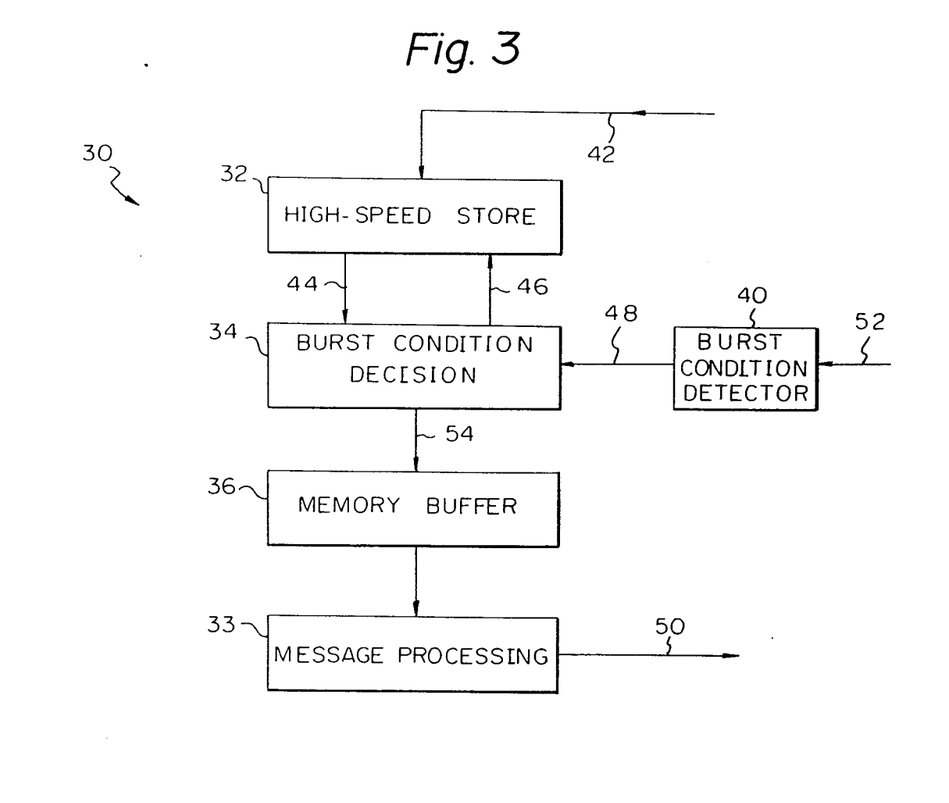
FIG. 3 is a schematic block diagram of a burst signal monitoring device embodying the present invention.

Referring to FIG. 3, a high-speed burst signal monitoring device in accordance with the present invention is shown which eliminates the drawbacks particular to the prior art device as discussed above. As shown, the device, generally 30, comprises a high-speed store means 32, burst condition decision means 34, a memory buffer 36, a message processing section 33, and burst state detecting means 40. Signals to and from the various blocks shown in FIG. 3 are a burst identification number 42, burst record data 44, burst condition data 46, a burst condition signal 48, a control message 50, a receive burst signal 52, and a control message transmission request signal 54. The burst identification number 42 is output from a receive timing control circuit (not shown). The receive burst signal 52 is output from a demodulator (not shown). The control message 50 is fed to a transmit signal generator (not shown).

The high-speed store means 32 is addressed by a burst identification number 42 to store therein burst condition data 46 which has been updated by the burst condition decision means 34. The means 34 reads burst record data 44 associated with that burst out of the store means 32, updates the burst record data 44 with the latest burst condition signal 48, and, if the result is decided to come under a control message generation condition, generates a write pulse to write a control message transmission request signal 54 into the memory buffer 36, the control message including a number assigned to a station for which the control message is meant. Meanwhile, the updated burst condition data 46 is written and stored in the store means 32.

The message processing section 33, whenever it is in an input ready state wherein it is ready to accept an input, periodically sees if the memory buffer 36 is empty and, if not empty, reads the control message transmission request signal 54 out of the memory buffer 36 to generate and transmit a control message 50.

Figure 4A:
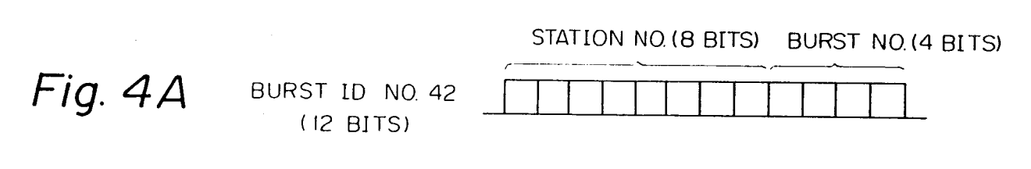
FIGS. 4A and 4B show waveforms of major signals appearing in the device of FIG. 3.
Figure 4B:
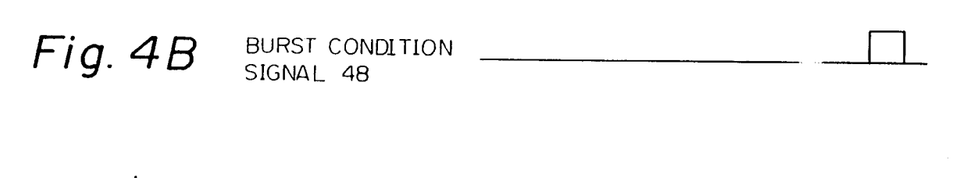

Exemplary waveforms of the input signals are shown in FIGS. 4A and 4B. The burst identification number 42 shown in FIG. 4A is added to burst data inside a burst signal processing device for internal processing purposes in conformity to a channel assignment pattern adapted to determine which burst should be allocated to which position in a frame. The illustrated burst identification number 42 comprises a eight-bit number assigned to a station and a four-bit burst number indicative of which one of all the bursts to be generated by that station the designated burst is. Shown in FIG. 4B is the waveform of the burst condition signal 48. The signal 48 is adapted to update the burst condition and may indicate "burst" when it is high level at a certain time and "no burst" when it is low level.

Figure 5:
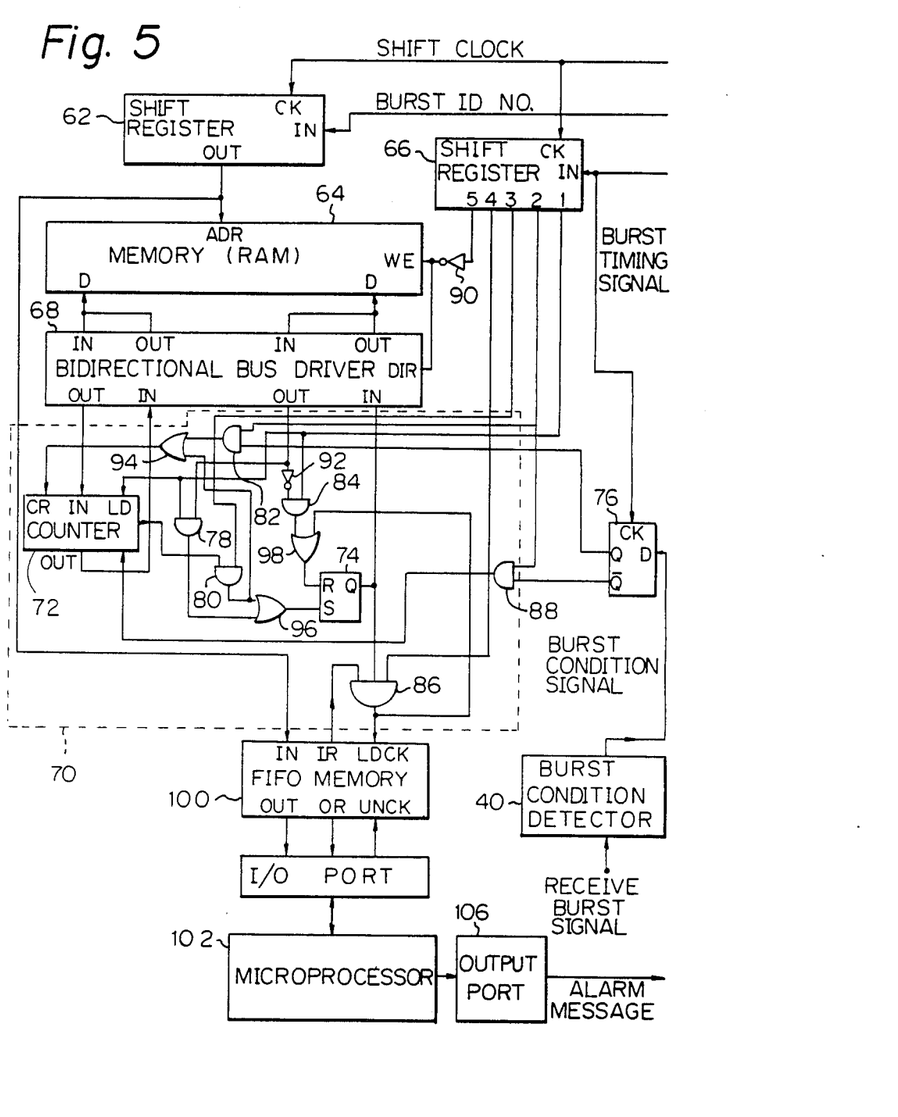
FIG. 5 is a circuit diagram showing a specific construction of the device of the present invention.

Referring to FIG. 5, the burst monitoring device of the present invention is shown in a specific circuit construction which is applicable to the TDMA communications system. The device of FIG. 5 is assumed to transmit an alarm message as a control message when no burst has been detected over K frames.

In FIG. 5, a shift register 62 (e.g. 74LS164) is clocked by shift in clock to shift a burst identification number to thereby address a random access memory (RAM) 64, which serves as a high-speed store means. A shift register 66 (e.g. 74LS164), also clocked by the shift clock, shifts a burst timing signal to generate pulses at timings or times 1–5 for internal processing which will be described. A bidirectional bus driver 68 (e.g. 74LS240) may be omitted in case the RAM 64 has discrete input and output lines. A burst condition decision section, generally 70, comprises a counter 72 (e.g. 74LS163) for counting consecutive no burst frames, flip-flops 74 and 76 (e.g. 74LS74A), AND gates 78, 80, 82, 84, 86 and 88, inverters 90 and 92, OR gates 94, 96 and 98, and a first-in-first-out (FIFO) memory 100. In this particular example, the message processing section is implemented by a microprocessor 102 to and from which data are input and output via an input/output port 104 and an output port 106.

Figure 6:
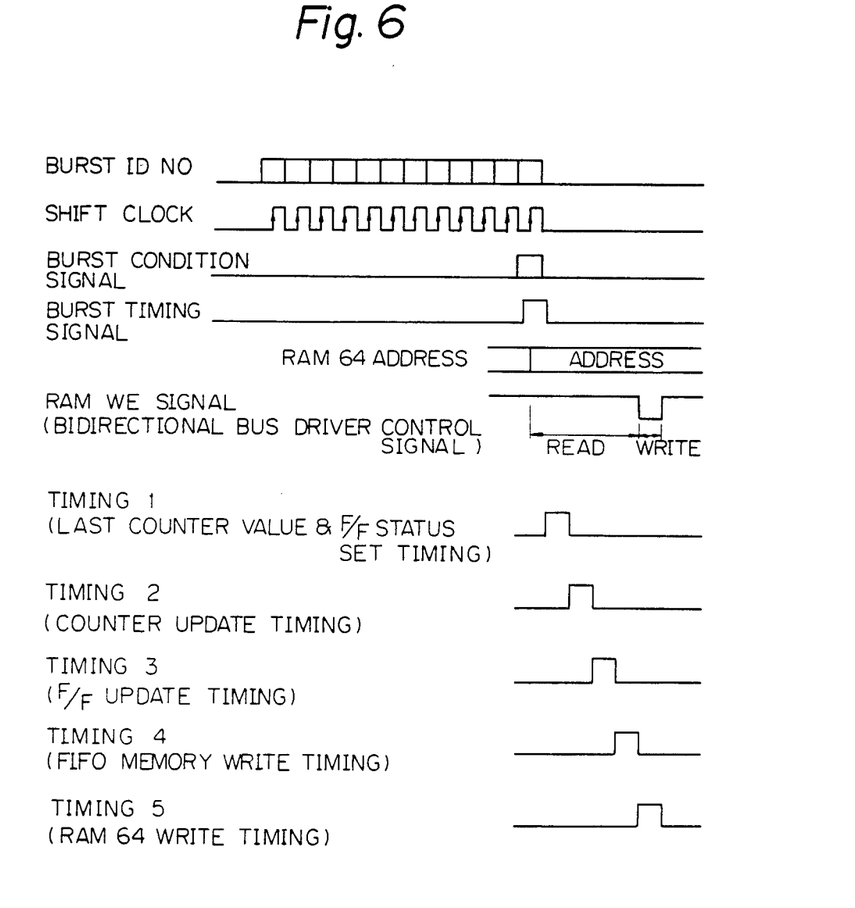
FIG. 6 is a timing chart showing major signals appearing in the circuitry of FIG. 5.

The internal processing is timed by the timing pulses 1–5 according to the sequence shown in FIG. 6. As shown in FIG. 6, the RAM 64 is conditioned for a read mode throughout the timing 1–4 and for a write mode at the timing 5 in response to the polarity of a write enable (WE) signal, while the bidirectional bus driver 68 controls the direction of data flow depending upon the read/write mode of the RAM 64.

When a burst identification number has been latched by the shift register 62 and applied to the RAM 64 to address it, record data associated with that burst is read out at a data output terminal D of the RAM 64. Here, the record data comprise the immediately preceding count of the counter 72 and the status of the flip-flop 74. These record data respectively are set in the counter 72 and the flip-flop 74 at the timing 1. Meanwhile, a burst condition signal arriving at this time is latched by the flip-flop 76 in response to a burst timing signal and, at the timing 2, reflected on the counter 72 such that the counter 72 is cleared if the signal has indicated "burst" this time and incremented by 1 if it has indicated "no burst".

The output of the counter 72 is applied to a set terminal S of the flip-flop 74 at the timing 3. If the count of the counter 72 is K, the counter output will set the flip-flop 74 and, if not greater than K, it will maintain the output at a Q terminal of the flip-flop 74 unchanged. The AND gate 86 provides AND of the Q terminal output of the flip-flop 74, timing 4, and a signal indicative of an input ready (IR) state of the FIFO memory 100, the AND being fed as a write pulse to the FIFO memory 100. If the FIFO memory 100 is in an input ready (not full) state and the Q terminal output of the flip-flop 74 is high level, a burst identification number at that instant will be written into the FIFO memory 100. Then, at the timing 5, the count of the counter 72 and the status of the Q terminal output of the flip-flop 74 are written into the RAM 64 as the lastest record so that they will be read out at the time of the next burst receipt. Such a procedure is repeated thereafter.

If the FIFO memory 100 is full and, so, its IR terminal is low level representative of an input unready state, the Q terminal output will be written into the RAM 64 at the timing 5 without being reset even though the Q terminal output of the flip-flop 74 may then be high level indicative of alarm generation. Hence, the Q terminal output of the flip-flop 74 will be preserved every time until the FIFO memory 100 regains an input ready state to allow alarm data to be written thereinto and the flip-flop 74 is reset.

While the microprocessor 102 is not processing and in an input ready state, it periodically checks an output ready (OR) signal indicative of an output ready state of the FIFO memory 100. If the OR terminal of the FIFO memory 100 is high level indicative of an output ready (not empty) state, the microprocessor 102 delivers a write pulse from the input/output port 104 to the FIFO memory 100 so as to fetch alarm data therefrom namely, the data intended for the station to which an alarm should be sent. In response to this data, the microprocessor 102 prepares an alarm message and sends it out through the output port 106. Upon completion of the alarm message processing on one burst, the microprocessor 102 checks the OR terminal of the FIFO memory 100 again.

Although the FIFO memory 100 in the embodiment shown and described is directed to transmitting a control message while preserving the order of generation of message transmission requests, it should be noted that a memory buffer other than the FIFO type may be used. In addition, while the foregoing description has related to specific conditions as the basis of a control message generation decision, specific details of a control message, and specific internal timings, such is only illustrative and a similar construction and arrangement is applicable even to a more complicated control message generation condition as well.

In summary, it will be seen that the present invention provides a high-speed burst monitoring device which adapts itself to an increase in the number of bursts to be handled without the need for an increase in the number of circuit elements, so long as the number of bursts lie within an allowable range relating to the addresses of a high-speed memory, which is included in the device, and the number of data bits. Thus, the device of the present invention is free from the previously discussed drawback of the prior art device that, since a shift register cannot hold data more than one frame time, a common signal processing circuit fails to process all the bursts if its processing time is increased.

Various modifications will become possible for those skilled in the art after receiving the teachings of the present disclosure without departing from the scope of the claimed invention.

What is claimed is:

1. A high-speed burst monitoring device for constantly monitoring receipt conditions of a stream of burst signals received in respective time frames in a time division multiplex access (TDMA) communications system and, depending upon a result of examining each of the receipt conditions, generating, if necessary, a control message for transmission to a station which has transmitted a particular burst signal, said burst monitoring device comprising:

burst condition detecting means for detecting a burst condition of a particular received burst signal in a current time frame and generating a current burst condition signal;

burst condition decision means for providing current burst condition data in response to the current burst condition signal output from said burst condition detecting means, and further in response to burst record data indicative of burst condition data derived from corresponding burst signals in prior time frames, determining whether generation of a control message is necessary and, if necessary, generating a control message transmission request signal for requesting generation of such above-mentioned control message;

high-speed store means for storing the current burst condition data, said data being indexed by a burst identification number which is assigned thereto so as to enable said current burst condition data to be read out of said high-speed store means as burst record data for succeeding time frames;

a memory buffer for temporarily storing the control message transmission request signal output from the burst condition decision means and the corresponding burst identification number and     message processing means for receiving from said memory buffer a stored control message transmission request signal and the corresponding stored burst identification number to generate a control message associated with the burst condition of the particular received burst signal and provide such control message to a transmitter for transmission.

2. A device as in claim 1, wherein said current burst condition signal is indicative of whether no burst signal has been received from a particular transmitting station in said current time frame.

3. A device as in claim 1, wherein said burst record data and current burst condition data are respectively indicative of a burst condition of burst signals received from a particular transmitting station in prior and current time frames, respectively.

4. A device as in claim 1, wherein said burst identification number includes a transmission station number and a burst number indicative of a position of such particular burst in a sequence of bursts transmitted by said transmitting station.

* * * * *